No. 731,463. PATENTED JUNE 23, 1903.
J. L. JONES & R. L. RHEA.
SEEDER.
APPLICATION FILED JAN. 4, 1901. RENEWED MAY 4, 1903.
NO MODEL. 3 SHEETS—SHEET 1.
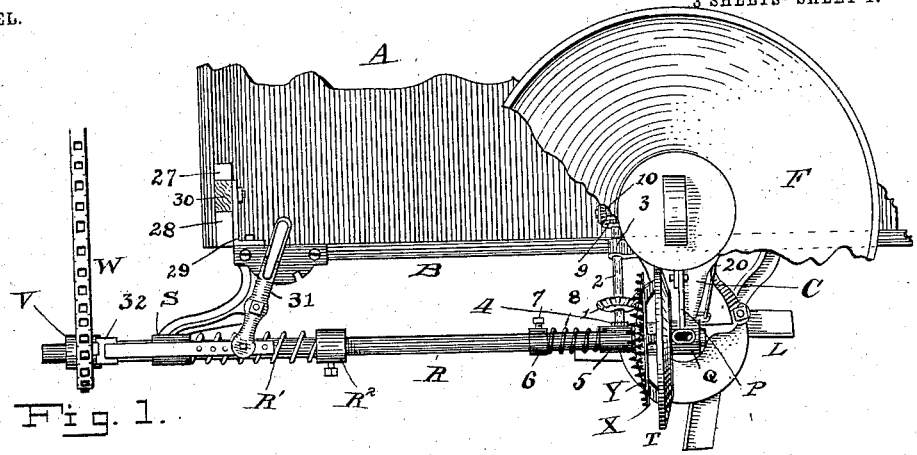
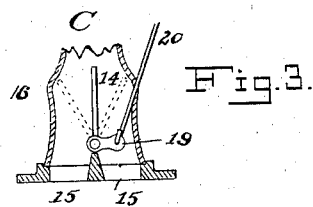
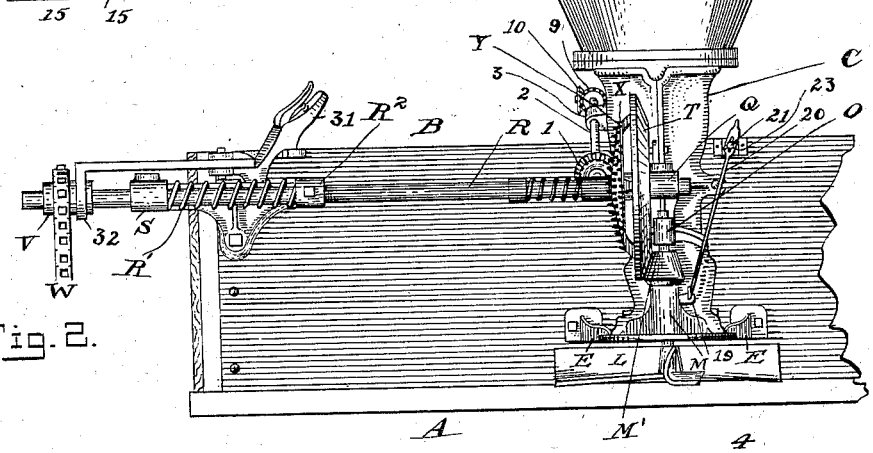
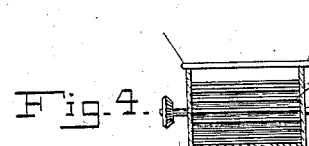
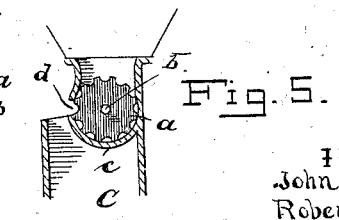
WITNESSES
INVENTORS
John L. Jones
Robert L. Rhea,
By L. M. Thurlow,
Atty.

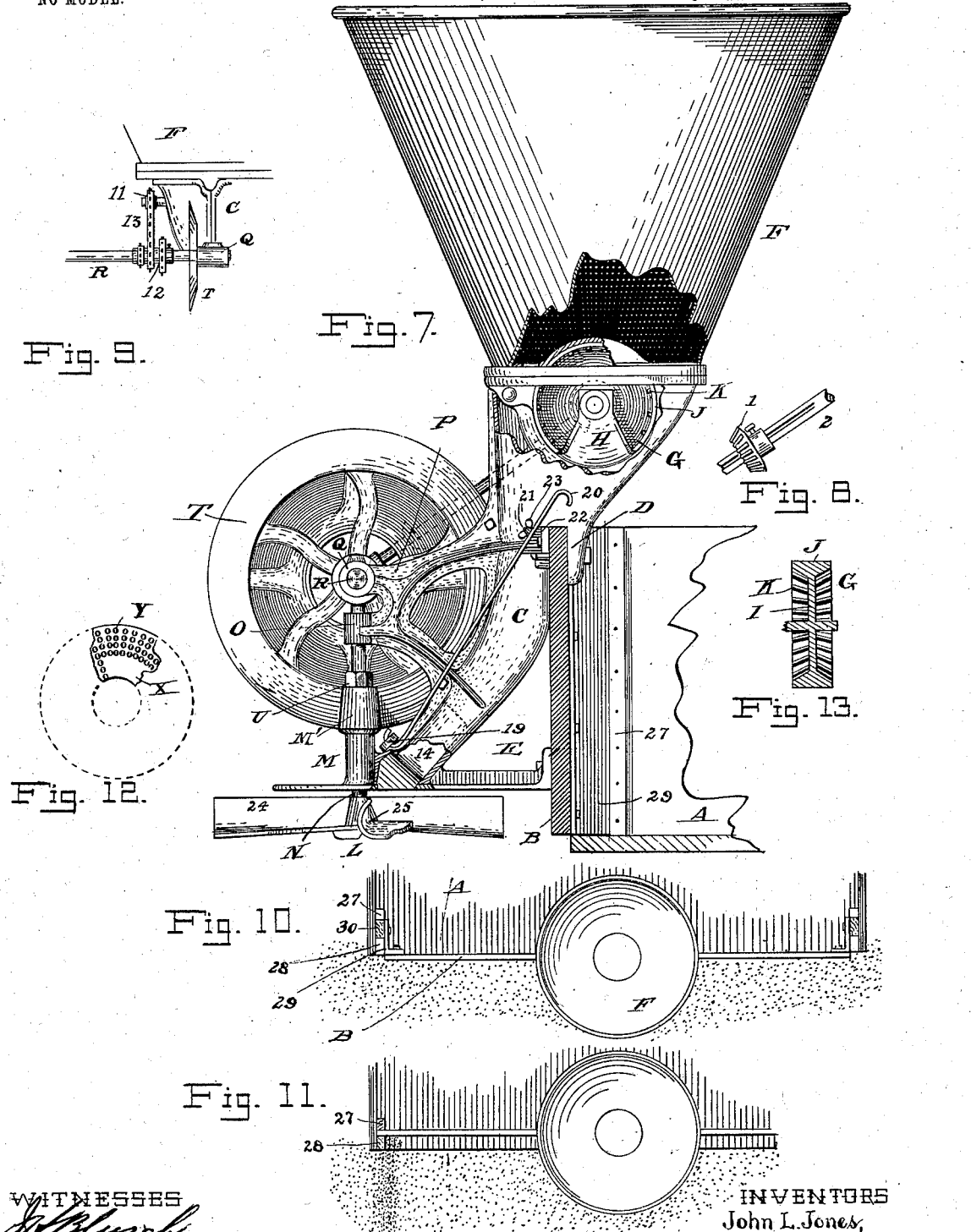

No. 731,463. PATENTED JUNE 23, 1903.
J. L. JONES & R. L. RHEA.
SEEDER.
APPLICATION FILED JAN. 4, 1901. RENEWED MAY 4, 1903.
NO MODEL. 3 SHEETS—SHEET 3.

WITNESSES
INVENTORS
John L. Jones,
Robert L. Rhea,
By L. M. Thurlow
Atty.

No. 731,463. Patented June 23, 1903.

UNITED STATES PATENT OFFICE.

JOHN L. JONES AND ROBERT L. RHEA, OF PEORIA, ILLINOIS, ASSIGNORS TO THE RHEA, THIELENS IMPLEMENT COMPANY, OF PEORIA, ILLINOIS, A CORPORATION OF ILLINOIS.

SEEDER.

SPECIFICATION forming part of Letters Patent No. 731,463, dated June 23, 1903.

Application filed January 4, 1901. Renewed May 4, 1903. Serial No. 155,682. (No model.)

*To all whom it may concern:*

Be it known that we, JOHN L. JONES and ROBERT L. RHEA, citizens of the United States, residing at Peoria, in the county of Peoria and State of Illinois, have invented certain new and useful Improvements in Seeders; and we do hereby declare that the following is a full, clear, and exact description of the invention, which will enable others skilled in the art to which it appertains to make and use the same.

This invention relates to broadcast seeders of that class usually carried on the end-gates of wagons.

The invention has for one of its objects to provide a new form of driving mechanism for operating the feeding device and distributing-fan and provide a yielding pressure of one of the driving-wheels on its neighbor for the purposes hereinafter explained.

Furthermore, the object is to combine with said driving mechanism a force-feed of the ordinary type.

A further object of the invention is to furnish means for varying the amount of grain sown, such means replacing the cut-off slide ordinarily placed beneath the hopper.

Another object of the invention is to locate a valve within the spout which conducts the grain from the hopper to the distributing-fan for changing the flow of seed to the right or left side, all of which will be disclosed in the specification following.

A further object in addition to those already stated is that of providing a new form of fan or distributer which will accomplish better distribution of seed.

Furthermore, an object is to provide a peculiar form of end-gate and an improved manner of mounting it upon the wagon-box and arranged so as to permit the seed to be evenly distributed, all of which will appear presently.

Figure 14:
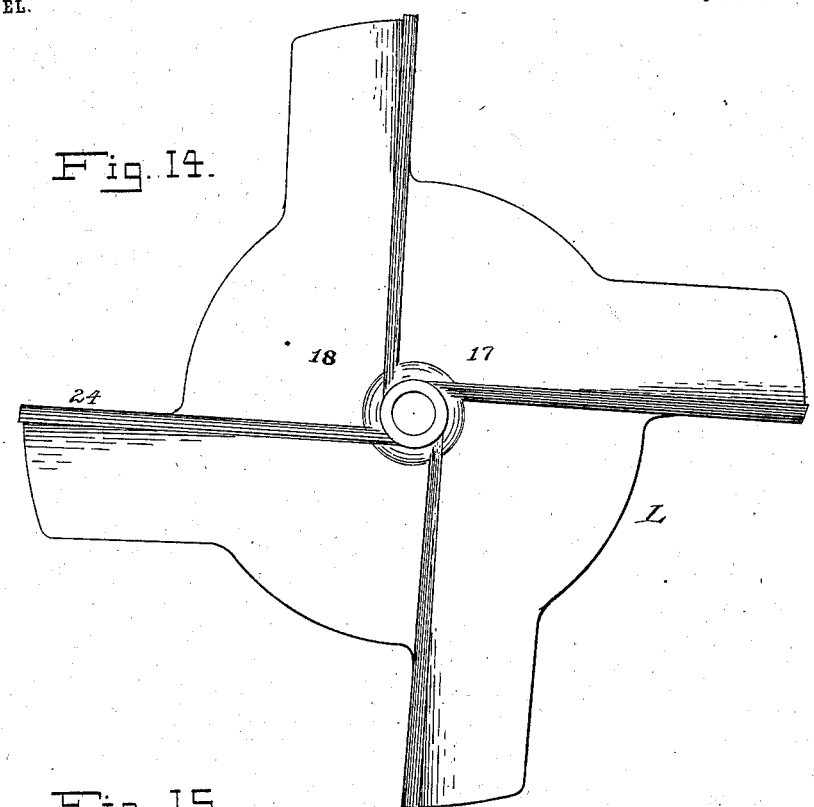
Figure 15:
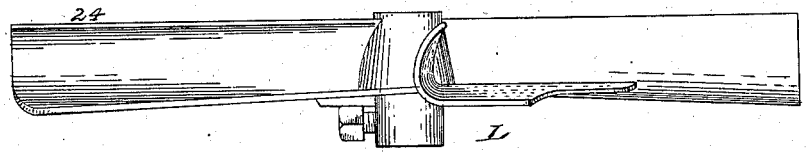
Figure 16:
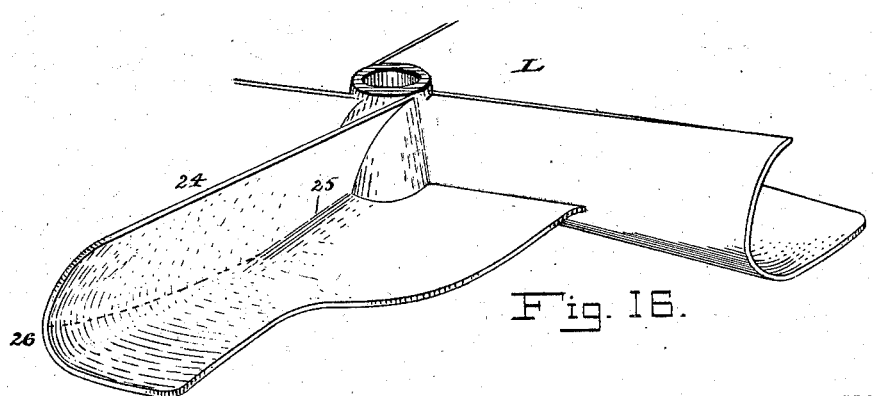

In the accompanying drawings, Figure 1 is a plan view of our improved seeder, showing the extended end-gate and the seeder mounted thereon. Fig. 2 is the rear elevation of the same. Fig. 3 is an elevation in section of a valve in the conducting-tube. Fig. 4 is an elevation of a form of fluted feed-roll. Fig. 5 is an end view of the same. Fig. 6 is a socket for supporting one of the driving-shafts. Fig. 7 is an enlarged side view of our improved seeder with a portion broken away to show the interior construction. Fig. 8 is a side view of a shaft and pinion shown in Fig. 7. Fig. 9 is a modified form, in elevation, of driving mechanism for the feed-wheel. Fig. 10 is a plan view of the end-gate which carries the feeder. Fig. 11 is the plan view of an end-gate as usually mounted. Fig. 12 is a face view of a portion of a toothed disk-wheel constituting a part of the gearing for driving the feed-wheel. Fig. 13 is a cross-section of the feed-wheel. Fig. 14 is a plan view of our improved form of distributing-fan. Fig. 15 is an edge view of the same. Fig. 16 is a perspective view of a portion of the fan, more clearly showing the peculiar form of the same.

A is the wagon-body, and B the end-gate, mounted thereon in the manner hereinafter described. Upon the end-gate is mounted in suitable manner a conducting tube or spout C, Fig. 7. We prefer to mount this as shown in Fig. 7, in which a lug or projection D extends down behind the end-gate at the top and is secured by means of a bolt. A pair of arms E at the bottom of said spout C are bolted to the end-gate near the bottom substantially in the manner indicated. This serves to support the entire seeding attachment in a perfectly rigid manner, though of course other means may be employed. Upon the enlarged upper end of the portion C is a hopper F, and beneath it is a feed-wheel G, journaled in suitable bearings, (indicated at H.) A cross-section of this wheel is shown in Fig. 13, in which I indicates a central web, and J the rim of the wheel. Each inner surface of the rim is beveled and carries a series of ribs K. The wheel being beneath the hopper receives grain therefrom and by means of the ribs delivers it into the spout C in an even flow, through which it passes to the fan or distributer L below.

In Figs. 4 and 5 we illustrate a second form of feed mechanism, which consists of a fluted roller $a$, carried by a shaft $b$. This revolves within a casing $c$, which has an opening at $d$, through which the grain is delivered into the tube C. We may use this form as well as the one already described, as both will operate equally well in practice. A vertical bearing M, formed with the bottom of the spout C, supports the lower end of a shaft N, and the upper end of such shaft is supported in a bearing O, forming a part of a projecting arm or support P on the spout C. The fan L, before referred to, is secured to the lower end of the said shaft N and will be described presently. A horizontal bearing Q, immediately above said bearing O, supports one end of a horizontal driving-shaft R, whose opposite end is carried in a bearing S, secured to the end-gate of the wagon, as shown in Fig. 1. Upon the shaft R, adjacent to the said bearing Q, is a beveled friction-wheel T, having frictional contact with a friction-cone M', mounted on the vertical shaft N, described, and locked against movement thereon by a nut U or other good means. On said shaft R next the bearing S is a spiral spring R', which is compressed between said bearing and a collar $R^2$. It will be seen that the purpose of this is to put an end pressure upon the shaft toward the seeder, and thus keep the wheel T against the cone M. This construction is provided so that if the cone or wheel, or both, should run out of true the spring will permit a yielding pressure, whereby both said members are kept in close frictional contact at all times. A further advantage of this construction is that when the machine is suddenly started the cone and wheel will slip on one another, and no damage can then possibly occur to any of the parts of the apparatus. A sprocket-wheel V on the outer free end of the shaft R receives motion through a sprocket-chain W from a sprocket-wheel on the carrying-wheel of the wagon, but not shown. By this means rotary motion is imparted to the fan through the friction-wheels, as is evident. The change in the quantity of seed delivered to the fan is regulated by imparting a greater or less speed to the feed-wheel G. In attaining this end we may employ several different forms of gearing, one of which is indicated in Figs. 1, 2, 7, and 8. This consists of a toothed disk-wheel X, made with or attached to the rear side of the friction-wheel T. The arrangement of this is partially shown in Fig. 12, in which a series of teeth Y are indicated, which engage with a beveled gear-wheel 1 on a shaft 2. The latter is carried in a bearing 3 on the tube or spout C and journaled at its opposite end in a socket 4 of a sleeve 5, carried on the shaft R. The said socket is of sufficient depth to provide a bearing for the shaft 2 and at the same time prevent rotation of the sleeve 5 upon the shaft R. A collar 6 is secured on the latter shaft by means of a set-screw 7, and a spring 8 between the said collar and sleeve keeps the latter against the hub of the wheel T or other stop, thereby keeping the shaft 2 in perfect line and the gear-wheel 1 in engagement with the disk-wheel. A beveled gear 9 on the end of the shaft adjacent to the hopper meshes with similar wheel 10 on the feed-wheel shaft, as in Figs. 1 and 2. The gear-wheel 1 is capable of adjustment upon the shaft 2 by means of a set-screw or other good means. A keyway in the shaft and a feather within the gear-wheel serve to prevent movement of the wheel on the shaft. It is evident that as bevel gear-wheel 1 is moved nearer the shaft R its speed will be reduced and when moved in the opposite direction the speed will be increased. Another form of mechanism is indicated in Fig. 9, in which a sprocket-wheel 11 is substituted for the bevel-wheel 10 on the feed-wheel shaft, and a sprocket-wheel 12 on the shaft R acts as a substitute for the gear-wheels X and 1. A sprocket-chain 13 serves to impart motion from the said wheel 12 to the feed-wheel. The wheel is shiftable on its shaft, whereby any desired speed within the range of the several-sized sprockets may be had. Either of these two forms of gearing may be used, and the result of either will be the same. By using a changeable gear, such as described, the amount of seed fed to the distributing-fan L by the feed-wheel is under perfect control, whereas in former devices of this class a change of feed was usually brought about by changing the size of the openings in the bottom of the hopper to effect the amount of seed permitted to such feed-wheel. Another manner of transmitting motion to the feed-wheel and one that we intend to employ is a system of friction-wheels similar to those used for driving the fan, but so arranged that by shifting one of them the speed of the feed-wheel may be regulated, as and for the purposes herein explained. It is sometimes necessary to sow grain at one side of the seeder—as, for instance, in finishing the edges of fields and in fence-rows. We accomplish this by the use of the valve or cut-off 14 in the bottom of the grain-spout C, a detail of which is shown in Fig. 3. When the said valve occupies a vertical position, the grain passes through both openings 15 and falls upon the fan L in front of the shaft N. The rapid revolution of the latter member naturally distributes the seed in all directions. The dotted line 16 in said Fig. 3 indicates the position of the valve when thrown to the left when viewing the machine as in Fig. 2. This causes the grain to flow through the opening 15 at the right upon the fan at about the spot indicated by 17 in Fig. 14. This will cause the grain to be cast to the left side of the field. By throwing the valve to the right the grain will be made to fall upon the fan at about the point 18 and will be cast toward the right. It will be readily understood that the difference in the position of delivery upon the fan will naturally occasion a difference in the direction of distribution. The means for operating the valve 14 consists in rigidly securing the arm 19 to the pivotal point thereof and attaching to its outer end a rod 20, which extends forward and upward to the top of the end-gate and has a slotted extremity which straddles a threaded stud 21 on a bracket 22. A wing-nut 23 secures the said rod in whatever position it may be placed, all of which will be readily understood. Attention is directed at this time to the peculiar form of the fan L. As ordinarily constructed the arms of the fan are lower at their outer ends than at the center, as shown in Figs. 2 to 7 and 15. A reverse curve is usually given the vertical back 24; but this is not shown in the drawings and is not necessarily a requirement in our improved form. In Figs. 7 to 15 and 16 we show a substantially square corner formed by the horizontal and vertical members as used by most fans, and this gradually opens into the rounded corner at the free extremity of the arm. This, with the gradual drop described, causes the grain to describe an upward-curved path, as indicated by the dotted line 26. As a result of this the grain is thrown to a greater distance and a much better cast is obtained. In reaching the end of the arm the grain is naturally carried farther away from the center of the fan and by reason of being carried up upon the back 24 is thrown directly away from it. In practice this has been found to accomplish better results than the older forms. A point of considerable merit lies in the manner in which we attach the end-gate to the wagon. In place of introducing the gate itself between the cleats 27 and 28 it is removed some distance from them to the very rear of the wagon-box, as shown in Figs. 1 to 7 and 10. To accomplish this, a bracket 29 is attached to the end-gate, and the free end thereof carries a strip 30, designed to enter between the cleats, as shown. The advantage of thus removing the gate is that in distributing the grain it is not interrupted by projections on the wagon-box, as is usually the case. Fig. 11 shows the disadvantage of the old constructions. The seed lodges in the corner formed by the end of the box and the gate and falling upon the ground leaves a trail of grain, which is wasteful and makes an uneven stand of growing grain.

We have not dwelt at length upon the construction and peculiar operation of the feed-wheel, for the reason that these are common to seeding-machines and will be understood by those skilled in the art; but, as we have already indicated, the use of the form of feed-wheel shown in Figs. 7 and 13 is new in a broadcast seeder of the type described. This also applies to the changeable gear for the feed-wheel. With reference to the valve 14 it may be said that its particular location is not important. It may be placed immediately beneath the feed-wheel by employing a central division-wall beneath to run entirely to the bottom of the seed-spout, so that the grain will be carried to one side or the other in a positive manner, or said valve may be located at any other point in the spout desired.

We have already stated the advantage of our improved fan and the change of position of the end-gate B, and in connection therewith it may be said that they may be altered in various details of construction without departing from the spirit or intent of the invention. This applies also to various portions of the seeder.

Having thus described the invention, we claim—

1. In a seeding-machine for wagon end-gates, the combination of a seed-tube secured near its top to the end-gate and curving away therefrom toward the bottom, a hopper and seed-wheel on the top of such tube, means for driving the seed-wheel, a vertical shaft journaled in the region of the lower end of the mouth of the tube but wholly outside of such tube, a distributing-fan on the lower end of the shaft to revolve beneath the mouth of the tube and distribute the seed therefrom, a friction-cone on said shaft, a friction-wheel in contact with the cone for driving the fan and a shaft for carrying the said friction-wheel, the same being driven from the wheel of the wagon as described.

2. In a seeding-machine for wagon end-gates, the combination of a seed-delivery tube secured to an end-gate, and providing the means of support for the entire seeder, a hopper and feed-wheel at its upper end, a friction-cone and its vertical shaft having its bearing on a projection of said tube, a horizontal shaft journaled on the end-gate and a friction-wheel on said shaft to engage and drive the said cone, such shaft being driven from the wheels of the wagon, a shaft at right angles to said horizontal shaft for driving the feed-wheel, a gear-wheel on said feed-wheel shaft the same being slidable thereon, a disk-wheel on the horizontal shaft for driving the said gear-wheel at various speeds by adjustment of said gear with reference to the face of the disk-wheel, a distributing-fan on the lower end of the cone-shaft for receiving seed from the supporting seed-tube, a valve within the tube for delivering the seed to the right or left side of the fan and means for shifting said valve all arranged substantially as set forth.

3. In a seeding-machine, the combination of the tube C secured to the end-gate of a wagon, a feed-wheel G and hopper F at the upper end thereof, the vertical shaft N journaled near the lower end of such tube, a distributing-fan L on said shaft beneath the tube, a friction-cone M' on the shaft, a horizontal shaft journaled on the end-gate, a friction-wheel T thereon to work with said cone, the disk-wheel X adjacent to such friction-wheel, the adjustable gear 1 to mesh therewith, the shaft 2 carrying said gear and driving mechanism at the end of said shaft 2 for operating the feed-wheel for delivering seed from the hopper to the seed-spout and distributing-fan all being arranged substantially as described and shown.

4. In a seeder of the character described, a seed-spout for receiving grain from the seed-hopper and delivering it for sowing, a fan beneath the spout for distributing the seed, a valve within the spout adapted to be thrown to the right or left to change the direction of discharge of the grain to the fan to the right or left and means for operating the said valve and maintaining it in the position placed.

5. In a seeding machine, the combination of the hopper F, the tube C for receiving seed from said hopper, the valve 14 pivoted in the middle of said tube at the bottom thereof, the openings 15 in the bottom of the tube at each side of the valve, the rod 20 connected to the valve for swinging it to either side to direct the grain to one side of the tube or the other as described and for the purposes set forth, a distributing-fan beneath said tube, a vertical shaft for carrying said fan, and means for driving the fan whereby by shifting the said valve to one side the seed will be distributed also at one side as set forth and described.

6. In a seeding-machine, the combination of the tube C secured near its upper end to the wagon end-gate and curving away therefrom toward its bottom, the hopper F at the top of the tube, seed-openings 15 at the delivery end of the said tube C, the valve 14 located above and between the said openings in the tube, the adjustable rod 20 for shifting said valve to guide the seed through one or the other of said openings for the purposes set forth, a seed-distributing fan L revolving beneath the tube, a shaft N for carrying the fan, a friction-cone N' on the shaft, a friction-wheel T adapted to drive said cone M', a shaft R for carrying and driving said friction-wheel to operate the fan through said cone, the toothed disk-wheel X on the said shaft R, the gear 1 engaging with said disk-wheel X and adapted for adjustment thereon for change of speed, the shaft 2 for carrying said gear, the beveled gears 9 and 10, the former carried on the said shaft 2, the feed-wheel within the hopper for delivering seed from said hopper to the tube C and distributing-fan, the shaft of said seed-wheel carrying the said gear 10 all arranged substantially as set forth and for the purposes explained.

7. In a seeder of the character described, the seed-spout C mounted on the wagon end-gate, a feed-wheel G journaled in the top thereof, a hopper above the same, a horizontal revoluble fan L beneath said spout C, a shaft N carrying the fan, a friction-cone M' on the said shaft, a friction-wheel T having contact with said cone M', a main driving-shaft R for carrying the friction-wheel, a toothed disk-wheel secured to the said friction-wheel, a shaft 2 at right angles to the shaft R, a shifting gear-wheel 1 on said shaft 2 for engaging the said disk-wheel, a pinion 9 on the opposite end of the shaft 2 and a pinion 10 on the shaft of the feed-wheel all arranged substantially as and for the purposes set forth.

8. In a seeder of the character described, a seed-spout C mounted on the wagon end-gate, a seed-wheel G journaled in the top thereof, a hopper above the same, a pivoted valve 14 within the spout, means for operating it, a horizontal revoluble fan beneath said spout C, a shaft N for carrying the fan, a friction-cone M', a main driving-shaft R to which said friction-wheel is secured, a toothed disk-wheel secured to the friction-wheel T, a shaft at right angles to the shaft R, a shiftable gear-wheel 1 on said shaft 2 for engaging said disk-wheel, a pinion 9 on the opposite end of the shaft 2, a pinion 10 on the shaft of the feed-wheel all arranged substantially as and for the purposes set forth.

9. In a distributer for seeding-machines, the body L and its hub for attachment to the carrying-shaft, said body sloping downward from said hub toward the outer limit thereof, the several hollow arms thereof extending radially from said hub, their bottoms also tending in a downward direction from the hub from which they start, the curved backs 24 of said hollow arms, the same overhanging the bottoms thereof their entire length, the corner formed by the said backs and the bottoms starting from the said hub in a square form but terminating in a round corner at the outer ends substantially as shown and for the purposes explained.

10. The combination with a seeding-machine of an end-gate having cleats on its rear side projecting rearwardly within the wagon-box, cleats secured to the inside of the wagon-box adjacent to the ends with which the said cleats on the end-gate are adapted to engage, said cleats supporting the end-gate beyond the end of the box for the purposes set forth and described.

11. In combination with a seeder of the character described, of the end-gate B, brackets 29 secured thereto and projecting within the rear end of the wagon-box, a cleat 30 secured to each bracket, and cleats 27 and 28 attached to the wagon-box and adapted to receive the said cleats 30 substantially as shown, said brackets supporting the said gate beyond to end of the wagon-box substantially as shown and for the purposes described.

12. In a wagon end-gate for seeding-machines, the wagon-body, supporting means secured thereto consisting of cleats secured to the inside of said body for holding the gate, the end-gate, and brackets attached thereto and projecting therefrom into the wagon-box for engaging the said supporting-cleats in said box, said cleats and brackets supporting the gate beyond the end of the sides and bottom of the wagon for the purposes described.

13. The combination with a seeding-machine for wagons, of an end-gate for carrying such machine, cleats secured to the inner surfaces of the sides of the wagon-box and means attached to and extending away from the endgate and projecting within the box for engaging the cleats, for holding the end-gate clear of the sides and bottom of the wagon-box and thus provide no lodging place for the seed.

In testimony whereof we affix our signatures in presence of two witnesses.

JOHN L. JONES.
ROBERT L. RHEA.

Witnesses:
FRANK W. WILLIAMS,
E. F. HALL.